United States Patent [19]
Martin

[11] 3,727,408
[45] Apr. 17, 1973

[54] UNIVERSAL JOINT EMPLOYING A FLUID BEARING

[75] Inventor: Stephen A. Martin, Sunnyvale, Calif.

[73] Assignee: United Aircraft Corporation, East Hartford, Conn.

[22] Filed: June 22, 1970

[21] Appl. No.: 48,356

[52] U.S. Cl. ............................. 60/232, 239/265.35
[51] Int. Cl. ............................................. F02k 1/24
[58] Field of Search ..................... 60/228, 229, 230, 60/231, 232, 242, 39.31; 239/265.19, 265.35

[56] References Cited

UNITED STATES PATENTS

| 3,143,354 | 8/1964 | Newcomb | 239/265.35 UX |
| 3,401,887 | 9/1968 | Sheppard | 60/232 X |
| 3,446,437 | 5/1969 | McCullough | 239/265.35 |

*Primary Examiner*—Carlton R. Croyle
*Assistant Examiner*—Robert E. Garrett
*Attorney*—Steven F. Stone

[57] ABSTRACT

A universal joint permitting the relative axial angular deflection of two axially spaced apart members comprising a body of fluid disposed between said first and second members and confined therebetween by a deformable membrane maintained in tension by the fluid. The use of such a seal as the load bearing seal in a movable exhaust nozzle assembly is disclosed.

21 Claims, 10 Drawing Figures

UNIVERSAL JOINT EMPLOYING A FLUID BEARING

BACKGROUND OF THE INVENTION

There are many applications in which two members must be connected together in such a way that the relative angular orientation of the members with respect to each other can be varied. Such applications range from simple toys, such as balancing boards, for example, through flexible pipe joints and torque transmitting mechanisms associated with the drive trains of vehicles, tools or other machines, for example, to such complex devices as the movable nozzle assemblies used in reaction motors in which directional control is obtained by changing the angular orientation of the exhaust nozzle with respect to the motor itself. In the past, universal joints permitting the axial deflection of two members have typically utilized various mechanical linkages involving pins, sleeves, bearings, balls and sockets of numerous designs, or employed structures which underwent a physical deformation upon deflection. While such universal joints are quite satisfactory for many applications, they tend to be unsatisfactory in situations where, in addition to a side moment tending to deflect the angular orientation of the members, the members are also subject to other loads such as, for example, loads tending to push the members together or to pull them apart. In such situations, these additional forces produce undesirable wear on the various moving surfaces of the joints which contact each other or tend to increase the moment required for actuation.

According to this invention, I have provided a universal joint which permits the relative angular deflection of two members in a substantially frictionless manner. This is accomplished according to my invention by providing, between the two members, fluid supported deformable membrane means which transmit all axial loads from one member to the other and undergoes a deformation of its cross-sectional configuration upon relative angular displacement of the two members.

It is accordingly an object of this invention to provide a universal joint employing a fluid supported membrane as the load bearing member.

It is another object of this invention to provide a relatively frictionless universal joint.

It is another object of this invention to provide a universal joint and seal for a movable nozzle on a reaction motor.

These and other objects of this invention will be readily apparent from the following description with reference to the accompanying drawings wherein.

DESCRIPTION OF THE INVENTION

Figure 1A:
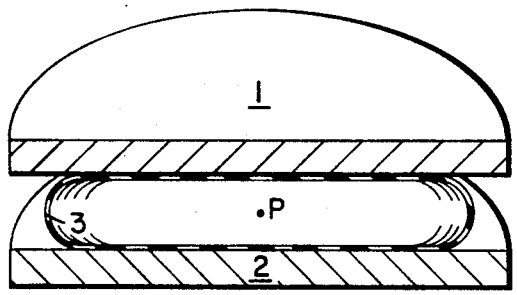
FIGS. 1a – 1f are sectional views through embodiments of this invention.
Figure 1B:
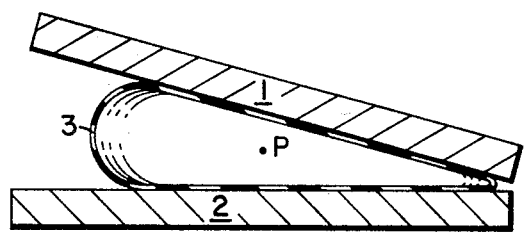
Figure 1C:
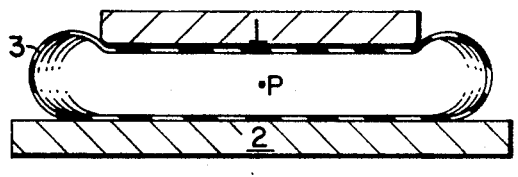
Figure 1D:
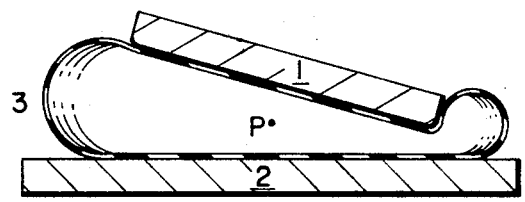
Figure 1E:
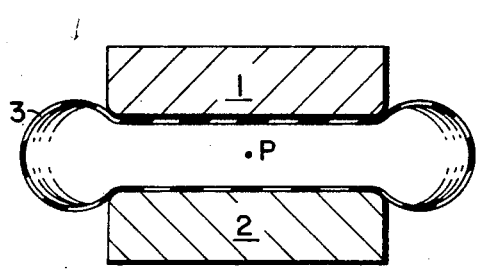
Figure 1F:
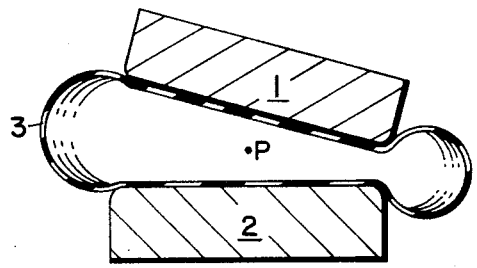

Referring now to FIGS. 1a, 1c, and 1e, simple embodiments of this invention are illustrated. Broadly stated, this invention contemplates first and second members 1 and 2 which are tiltable with respect to one another. These members are maintained in spaced apart relationship by fluid supported membrane means 3 which in these embodiments takes the form of a deformable bladder filled with a fluid and affixed either by bonding or other means to members 1 and 2. This bladder and the other membrane means disclosed herein are formed from a material which is readily deformed in a bending manner but is substantially resistant to nonbending stresses such as tension loads and shear loads. Numerous suitable materials are known to the bladder and diaphragm art and include rubber reinforced with nylon or glass fibers or filaments for example. Further, while the embodiments shown herein have relatively smooth walls, it should be recognized that the membrane means can be provided with peripheral corrugations or convolutions, for example, to facilitate cross-sectional deformation if a relatively rigid or thick material is used to form the membrane. The type of materials used and the size, thickness and configuration of the membrane means will, of course, be dependent upon the internal pressures that must be withstood during the operation of the device; it being understood that it is necessary to have the membrane wall sufficiently strong so that it can withstand the internal pressures generated therein without bursting. It should also be recognized that while some stretching of the membrane will occur regardless of the strength of the membrane wall, the preponderant factor in the operation of this joint is the change in configuration of the joint as will be explained below.

FIGS. 1a, 1c, and 1e show different embodiments of a joint according to this invention in their neutral or nondeflected conditions and FIGS. 1b, d and f show the same embodiments respectively in their deflected condition. The basic difference between the embodiments of FIGS. 1a, c and e are in the relative size of the members 1 and 2 with respect to the fluid supported membrane means 3. In FIG. 1a, the membrane means is fully within the boundaries of the two relatively tiltable members 1 and 2. In FIG. 1c, the fluid supported membrane means 3 is within the confines of member 2 but extends beyond the confines of member 1; and in FIG. 1e, the fluid supported membrane means is larger than both members 1 and 2 and extends beyond the confines of both. In all of these embodiments, the membrane means is bonded or otherwise affixed to members 1 and 2 to maintain integrity of the joint and to prevent relative rotation or complete separation of members 1 and 2. The fluid used to support the fluid supported membrane means may be either a gas or a liquid or a mixture of the two; it being understood that the choice of the fluid will have some effect upon the operating characteristics of the joint. For example, if a gas is used, the volume defined within the membrane will be a function of both temperature and pressure and the overall volume confined within the membrane means will vary although the mass remains constant. If a substantially incompressible liquid is used for the fluid, however, the volume defined within the membrane means will also remain substantially constant. For the remainder of the discussion of FIGS. 1, it will be assumed that the membranes are filled with a fluid; however, if the fluid has a gaseous component, the axial load placed on members 1 and 2 will remain substantially constant as member 1 is tilted. If a liquid is the fluid within the membrane, the axial load may vary since those variations will have an immaterial effect upon the configuration of the joint.

Referring now to FIG. 1b, the effect of an angular deflection of member 1 with respect to member 2 is shown. As can be seen, the cross-sectional configuration of the section of the bladder which is shown in FIG. 1 has been altered with the radius of curvature of the right hand portion of the membrane being decreased with a corresponding increase in the radius of curvature of the opposite edge of the membrane. Although the configuration of membrane 3 has been materially altered, the actual area encompassed by membrane 3 in the section shown in FIG. 1b is substantially equal to that of FIG. 1a. This relationship holds for all sections through the membrane 3 if the membrane undergoes relatively little stretching. Thus, the overall effect of deflection of the joint of FIG. 1a is a constant volume deformation of membrane 3 which results in the transfer of a mass of fluid from the right hand portion of the deformed membrane to the left hand portion of the deformed membrane. Similar results are also obtained upon deflection of the embodiments shown in FIGS. 1c and e. Deflections as shown in FIGS. 1d and f result in the radii of curvature of the right hand portions of the membranes being decreased with an increase in the radii of curvature of the left hand portions of the membranes with a relatively constant total area being confined within the sections shown. This relationship likewise holds true for all corresponding sections and the result is also a substantially constant volume in the configuration of the membranes 3. While the various embodiments shown operate in quite similar manner, the choice of the relative size of the movable members 1 and 2 with respect to the fluid supported membrane means 3 has some effect on the operational characteristics of the joint. Thus, for example, for any given axial load, the joint structure of FIGS. 1a and b will tend to be stiffer and more resistant to deflection than the joint structures of FIGS. 1c or e, for example. This is partly due to the fact that the members 3 in FIGS. 1d and e have tensile forces generated in those portions which extend beyond the members 1 and 2 and these tensile forces have components which tend to operate against axial compressive loads placed on the members 1 and 2. The net result of these tensile forces in the membrane is a reduction in the internal pressure experienced within the membrane as a result of any given axial load. The effect of changes in the characteristics of the fluid within membrane 3 can also be readily apparent from FIG. 1. Thus, if a relatively viscous material such as an oil is employed as the fluid, the device will tend to be more resistant to deflection than if a less viscous fluid such as water or a gas is used. On the other hand, higher viscosities will produce a greater dampening effect on any continued oscillation. Further, if a liquid is employed, the device shown in FIG. 2 could be used, for example, as a simple balance board type of toy whereas if a gas was used as the fluid the membrane would have some resiliency and could be used as both a bouncing and balancing type of toy. In other applications, members 1 and 2 could be drive shafts of power transmissions and the joint structure could be used as a universal joint wherein power has to be transmitted around a bend, it being remembered that members 1 and 2 are affixed to membrane 3 either by bonding or by appropriate fastening means. This will prevent relative rotation or lateral translation of member 1 with respect to member 2 since the membrane 3 is substantially resistant to shear stress which would be generated by any such motion.

In applications where the operating conditions of temperature and pressure are precisely known or in which some resiliency is desired in the joint, it may be preferable to utilize a gas as the fluid. A liquid, however, is usually preferred as the fluid since a given mass of a liquid has a relatively constant volume over substantial variations in temperature and pressure and the use of a liquid results in substantial simplification in the design of the joint. Suitable liquids include water, alcohols such as the aliphatic alcohols and glycols, lubricating oils and greases of various viscosities. In addition, the fluid can be self sealing or contain buoyant plugs to seal leaks in the membrane. Basically, almost any fluid can be used provided it is relatively stable and relatively nonreactive chemically with other elements of the joint which may contact the fluid. The choice of a particular liquid should, of course, be consonant with the operating requirements of the device. Water, for example, would be suitable for a device which would not be subject to extremes of temperature. Low freezing and high boiling liquids such as ethlene glycol or various types of oils or hydraulic fluids would be suitable where greater extremes of temperature are encountered. In addition, as pointed out above, the viscosity of fluid can be a parameter for the selection; low viscosity fluids such as gases, water or ethanol providing for easier actuation whereas high viscosity liquids tend to provide an oscillation dampening effect on the joint which may in some cases be desirable. It should also be noted that while FIG. 1 shows fluid supported membrane means as a bladder which encloses the entire volume of the recess the membrane means need not completely enclose the fluid. The only design requirement is that a sufficient amount of membrane be present to confine the fluid and to prevent the escape thereof from between members 1 and 2 at all design extremes of the joint. As can be seen from the above description, the joint of this invention permits the tilting of members 1 and 2 in a substantially frictionless manner in that there is no contact at all between members 1 and 2 and sliding motion between these members and the membrane 3 is negligible. Accordingly, the only major forces that must be overcome in operation are the forces associated with the bending deformation of the membrane and the force required to move a portion of the fluid from one side of the membrane to the other.

Figure 2A:
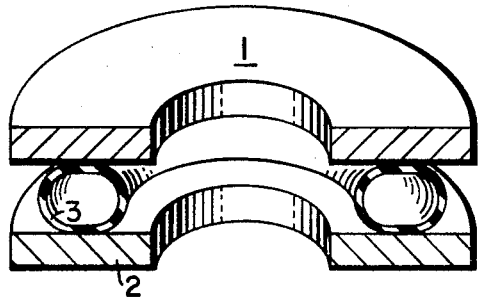
FIGS. 2a and 2b are sectional views through other embodiments of this invention.
Figure 2B:
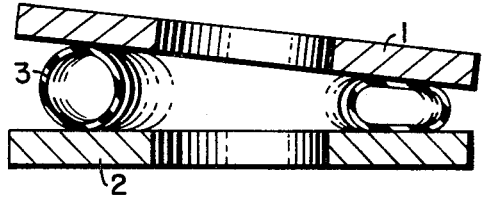

Referring now to FIG. 2, another embodiment of the joint of this invention is shown in which the fluid supported membrane means is shown in annular form rather than in the form of the circular bladder of FIG. 1. The embodiment of FIG. 2 is particularly useful where a lightweight seal is required since the mass of fluid which was previously in the center of the membrane has now been removed. It is also useful where it is necessary to provide a passage through the center of this seal for the transmission of fluid or the passage of apparatus, for example. The type of construction illustrated in FIG. 2 would also be suitable for use in the balance board type structure of FIG. 1 or in connection with pipe or tubular joints and in power transmitting systems. The joint of FIG. 2 comprises relatively tiltable members 1 and 2 which are shown in annular form; it being recognized, however, that one or both of members 1 or 2 need not be in annular form. Annular fluid supported membrane means 3 are disposed between and bonded or otherwise fastened to members 1 and 2. In some applications where direct connection is not practical, an acceptable alternative would require physical restraints on members 1 and 2 preventing their separation beyond the point at which contiguous contact between membrane means 3 and members 1 and 2 can be maintained. FIG. 2b shows the joint in its deflected position, and it can be seen that the right hand portion of the annular membrane 3 has been deformed into a flattened condition having a smaller radius of curvature at its inner and outer ends and the left hand portion has been deformed into an expanded configuration having a wider radius of curvature. As in FIG. 1, the total area confined by both the right and left hand portions of the annulus in the section shown is equal to that originally confined therein and this relationship also holds true substantially around the membrane. The result is a substantially constant volume deformation of the configuration of the annular membrane. It should also be noted that while the embodiment of FIG. 2 has been shown with a construction in which the relative size of the members 1 and 2 with respect to the fluid supported membrane 3 has been selected similar to FIG. 1a, constructions similar to those of FIGS. 1c and 1e can also be utilized. For example, by providing an annular protuberance on member 1 or both members 1 and 2 which protuberance has a width smaller than the width of the annulus itself, constructions similar to FIGS. 1c and e can be obtained. Similar results with respect to the effect on the actuation of the device would also be obtained. It should also be noted that the circular membrane means in addition to its other functions also functions as a seal, in FIG. 2, between the central portion in members 1 and 2 and the environment surrounding the structure. Thus, this type of joint is particularly useful when fluids are transmitted through members 1 and 2 as in a pipe joint or a nozzle assembly.

Figure 3:
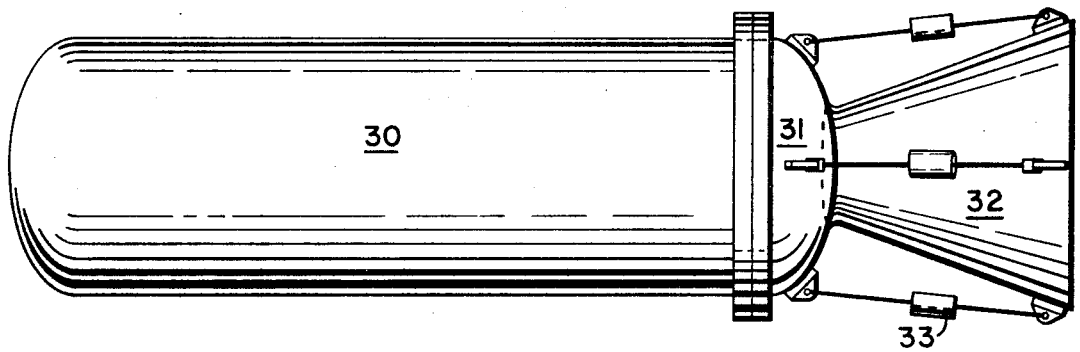
FIG. 3 is a side view of a movable nozzle reaction motor.
Figure 4:
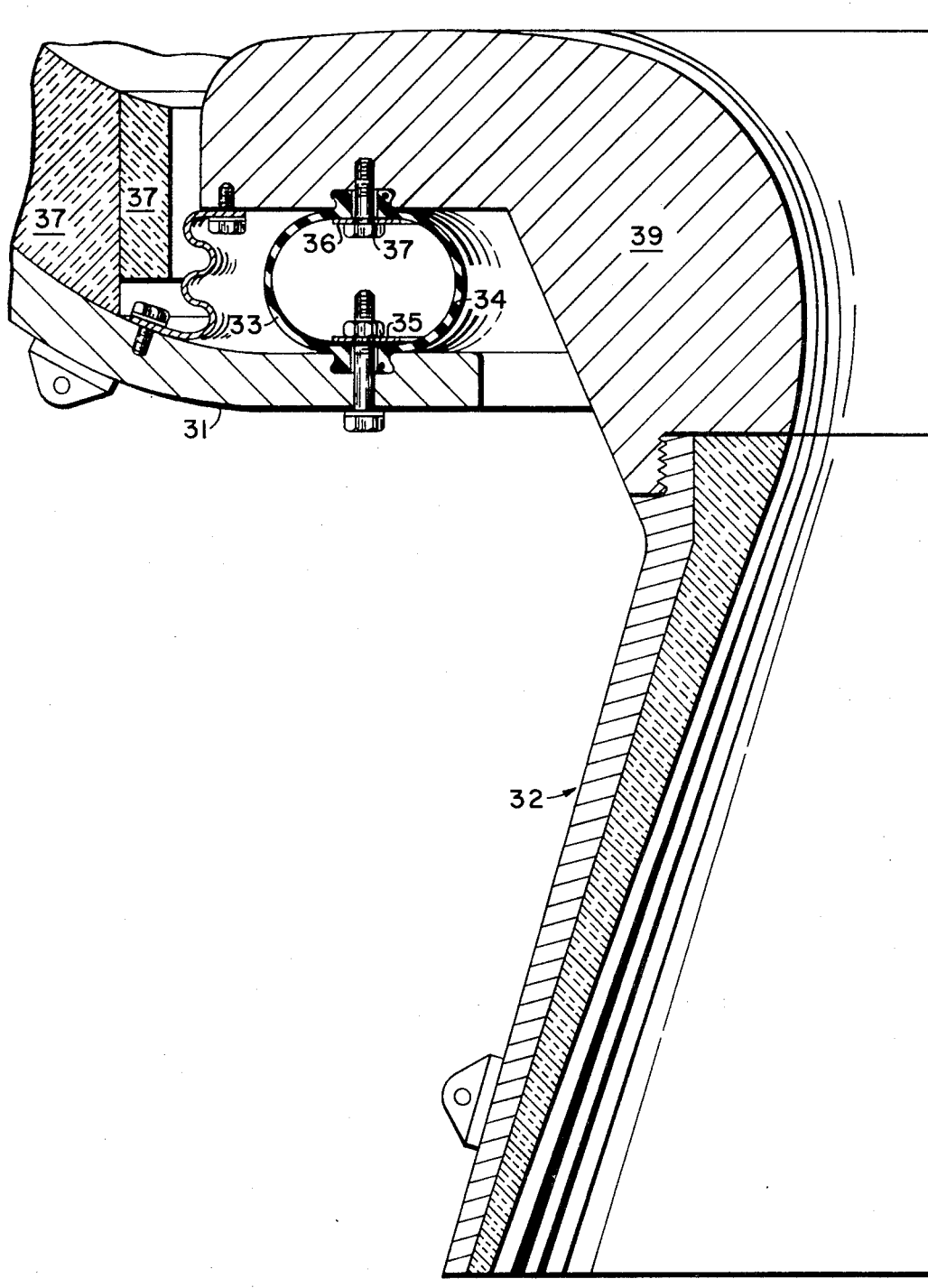
FIG. 4 is a section through the end portion of the structure of FIG. 3.

Referring now to FIGS. 3 and 4, the use of the fluid support membrane joint structure of this invention in a movable nozzle reaction motor to provide the load bearing joint and seal between the movable nozzle assembly and the motor will be described. It is in this application that many of the important properties of this invention find particular application as will be readily apparent from the following description. FIG. 3 is a general side view of a typical reaction motor having a movable nozzle. Such a motor may consist of a case section 30 containing the combustion chamber and an aft closure 31 which is affixed to case 30 and supplies the support for the movable nozzle 32. The various positions of the nozzle 32 can be adjusted through all quadrants as is known to the art by appropriate actuators 33 acting between the fixed nozzle support 31 and the movable nozzle 32. The particular method of actuating a movable nozzle is not critical with respect to this invention; and while hydraulic actuators re illustrated, it is recognized that any method for producing a relative angular deflection of the movable nozzle with respect to the case is suitable and includes without being limited to liquid injection of a fluid into the exhaust gas stream to cause a localized pressure gradient within the nozzle by the use of jet tabs or jet vanes or the use of various types of hydraulic, electrical or mechanical actuators.

FIG. 4 is a cross-section view along an axial plane through the movable nozzle and case structure of FIG. 3 showing the internal details of the construction with the actuators 33 being omitted for clarity. Referring now to FIG. 4, the end closure structure is shown generally as 31 and is provided with an axial opening through which the movable nozzle assembly 32 passes. The annular fluid supported membrane means of this embodiment is formed of two membrane portions 33 and 34 which are provided with beaded ends and are securely mounted in grooves in member 31 and in throat forming member 39 of the movable nozzle assembly 32 by means of annular clamping plates 35 and 36 and secured in place by bolts 37. The end closure is provided with thermal insulation 37 and in the form of rubber, for example, and a high temperature resistant cloth is provided between member 39 and member 31 to assist in retaining a temperature resistant grease between the cloth and member 33 to protect member 33 from the high temperature combustion chamber gases. Fluid supported membrane means 33 and 34 would be charged with a suitable fluid such as a temperature resistant silicone oil, for example, by leaving diametrically opposed bolt holes extending through member 31 open after assembly which bolt holes would be subsequently sealed after the fluid has been filled into the membrane. In operation, the joint would be stored at relatively ambient pressures which would be due primarily to the weight of the nozzle assembly 32. However, when the reaction motor is ignited, all of the blow-off loads which act on member 32 will be transmitted to member 31 through the fluid supported membrane means with the fluid being pressurized in reaction to the blow-off loads. In addition to permitting the transfer of all loads between member 32 and member 31, the fluid supported membrane means also serves as a seal in preventing the escape of a combustion chamber gases from between the nozzle assembly 32 and the closure 31. In this connection, it is particularly important that member 34 be securely fastened to both members 39 and 31 since the pressure differential across membrane 34, which is exposed to ambient pressures, is substantially greater than across member 33, which is exposed to combustion chamber pressures, and there will be substantial forces tending to pull member 34 out of its connection. Tilting of the nozzle assembly 32 with respect to nozzle support structure 31 will produce a deformation of the seal members 33 and 34 in a manner substantially similar to that shown in FIG. 2. Further, while the membrane means is readily susceptible to the bending type deformation associated with the tilting of the nozzle 32, it is substantially resistant to shear stresses which would be generated in portions of the membrane in the event of relative rotation or lateral translation of nozzle 32 and support 31.

In the preceding discussion, it has been assumed that a liquid was the fluid used in members 33 and 34, however, if a gas is the fluid used within members 33 and 34, for purposes of decreasing the weight, then in addition to the deformation produced by the tilting of members 32 and 31 an additional deformation of the members 33 and 34 will occur upon ignition of the rocket motor in that the blow-off loads will be transmitted to fluid which will result in an increase in pressure within the membranes together with a corresponding decrease in volume. The net effect of which will be a reduction in the radius of curvature of members 33 and 34 from that experienced in the unpressurized condition, however, once chamber pressure is achieved and while constant chamber pressure is maintained, the above described principal of operation will be similar regardless of whether a gas or a liquid is used as the pressurized fluid. Accordingly, the fluid supported load bearing joint structure of this invention functions as both the gas seal preventing the escape of combustion chamber gases from between the members 31 and 32 as well as the load bearing joint which transmits all the blow-off load on member 32 to member 31 while at the same time permitting relatively frictionless rotation or deflection of member 32.

While this invention has been described with respect to several embodiments thereof, it should not be construed as being limited thereto. Various modifications can be made without departing from the scope of this invention which is limited only by the following claims wherein:

I claim:

1. In a movable nozzle reaction motor comprising in combination a combustion chamber, a nozzle support structure, a movable nozzle assembly, means for angularly deflecting the axis of said movable nozzle assembly with respect to the axis of said nozzle support structure and load bearing joint means for deflectably mounting said movable nozzle assembly on said support structure and for transmitting at least a substantial portion of the axial loads on said movable nozzle assembly to said support structure; the improvement wherein said load bearing joint means consists essential of (a) a mass of fluid disposed between said movable nozzle assembly and said nozzle support structure, and (b) deformable membrane means maintaining said mass of fluid between said movable nozzle assembly and said nozzle support structure and maintaining said assembly and said structure in spaced apart relationship.

2. The reaction motor of claim 1 wherein said deformable membrane means is affixed to each of said movable assembly and said nozzle support structure and said membrane means is disposed in fluid sealing relationship with said nozzle support structure and said movable nozzle assembly whereby escape of fluid from the interior of said combustion chamber to the environment through the space between said nozzle support structure and said movable nozzle assembly is prevented.

3. Apparatus for permitting the angular deflection of the movable nozzle assembly of a reaction motor comprising, in combination:
   a. a movable nozzle assembly,
   b. a nozzle support structure, and
   c. fluid supported deformable membrane means disposed between said movable nozzle assembly and said support structure and maintaining said assembly and structure in spaced apart relationship.

4. The apparatus of claim 3 wherein said fluid supported deformable membrane means is annular.

5. The apparatus of claim 3 wherein said fluid supported deformable membrane means is adapted to undergo a substantially constant volume configuration deformation upon deflection of said movable nozzle assembly.

6. The apparatus of claim 3 wherein said deformable membrane means is disposed in fluid sealing relationship across the space between said movable nozzle assembly and said support structure.

7. The apparatus of claim 6 wherein said deformable membrane means is affixed to each of said movable nozzle assembly and said support structure.

8. A movable nozzle system for a reaction motor having a combustion chamber and a movable nozzle for exhausting combustion products therefrom, said system comprising, in combination:
   a. a first member comprising a movable nozzle assembly,
   b. a second member spaced apart from said first member and comprising a nozzle support structure,
   c. flexible membrane means affixed to each of said members and extending around said first member between said first and second members,
   d. a mass of fluid confined between said first and second members by said membrane means, said mass of fluid being sufficient to form said flexible membrane means into a configuration which maintains said members in spaced apart relationship, and
   e. means for angularly deflecting the axis of said first member with respect to the axis of said second member whereby the configuration of said membrane means is altered.

9. The system of claim 8 wherein the configuration of said membrane means in a deflected position confines substantially the same mass of fluid as the configuration in the nondeflected position.

10. The system of claim 9 wherein said fluid is a liquid.

11. The system of claim 8 wherein said flexible membrane means is affixed to each of said first and second members in fluid sealing relationship between the interior of said combustion chamber and the exterior of said reaction motor.

12. A universal joint construction for permitting relative angular deflection of the axes of two spaced apart components of a movable exhaust nozzle assembly comprising, in combination:
   a. a nozzle support member,
   b. a movable nozzle member spaced apart from said nozzle support member, and
   c. Fluid supported membrane means disposed between said nozzle support member and said movable nozzle member and maintaining said members in spaced apart relationship, said fluid supported membrane means comprising a fluid filled bladder fixed to said nozzle support member and said movable nozzle member in fluid sealing relationship between said members.

13. An angularly deflectable exhaust nozzle assembly comprising:
   a. a nozzle support member, b. a movable nozzle member spaced apart from said nozzle support member, c. flexible membrane means affixed to and disposed between said nozzle support member and said movable nozzle member and in contact therewith, d. an annular mass of fluid confined between said nozzle support member and said movable nozzle member by said membrane means, said mass being sufficient to maintain said members in spaced apart relationship, and e. means for angularly deflecting the axes of said members with respect to each other.

14. The improvement of claim 13 wherein said membrane means confine said mass of fluid as an annulus.

15. An angularly deflectable exhaust nozzle assembly comprising, in combination:

a. a nozzle support structure, b. a movable nozzle member, c. fluid supported deformable membrane means disposed between said support structure and nozzle member, said membrane means confining a mass of fluid with at least a portion of said membrane means being externally unsupported about its periphery.

16. The assembly of claim 15 wherein said membrane means confines a toroidal mass of fluid centered about the axis of said nozzle and said externally unsupported portion of the surface of said membrane means is disposed about said axis.

17. The assembly of claim 15 wherein said membrane means maintains said support structure and nozzle member in spaced apart relationship.

18. In a reaction motor comprising a source of a pressurized fluid, exhaust nozzle means in fluid communicating relationship with said source, joint means permitting angular deflection of the axis of said source and nozzle means, said joint means being disposed in fluid flow permitting relationship between said source and said nozzle means and means for angularly deflecting the axis of said nozzle means with respect to said source; the improvement wherein said joint means comprises:

a. first and second angularly deflectable members, b. fluid supported membrane means disposed between said first and second members, said membrane means confining a mass of fluid with at least a portion of said membrane means being externally unsupported about its periphery.

19. The reaction motor of claim 18 wherein said membrane means confines a toroidal mass of fluid centered about the axis of said nozzle and said externally unsupported portion of the surface of said membrane means is disposed about said axis.

20. The reaction motor of claim 19 wherein said mass of fluid is sufficient to maintain said first and second members in spaced apart relationship.

21. The system of claim 8 wherein at least a portion of said membrane means is externally unsupported around its periphery.

* * * * *